United States Patent
Schiek et al.

(10) Patent No.: US 8,851,216 B2
(45) Date of Patent: Oct. 7, 2014

(54) DEVICE FOR SEALING A COMPONENT HOUSING IN A MOTOR-VEHICLE DRIVE TRAIN

(75) Inventors: Werner Schiek, Jettingem (DE); Nils Sauvlet, Rutesheim (DE); Immo Stache, Vaihingen/Enz (DE)

(73) Assignee: Dr. Ing. H.C.F. Porsche Aktiengesellschaft, Stuttgart (DE)

( * ) Notice: Subject to any disclaimer, the term of this patent is extended or adjusted under 35 U.S.C. 154(b) by 1054 days.

(21) Appl. No.: 12/822,785

(22) Filed: Jun. 24, 2010

(65) Prior Publication Data

US 2011/0006623 A1 Jan. 13, 2011

(30) Foreign Application Priority Data

Jul. 8, 2009 (DE) .......................... 10 2009 032 112

(51) Int. Cl.
*B60K 6/20* (2007.10)
*B60K 6/405* (2007.10)
*B60K 6/48* (2007.10)
*B60K 6/387* (2007.10)
*B60W 10/02* (2006.01)
*B60W 10/06* (2006.01)
*B60W 20/00* (2006.01)
*B60W 10/08* (2006.01)

(52) U.S. Cl.
CPC ........ B60K 6/405 (2013.01); B60W 2510/0604 (2013.01); Y02T 10/6221 (2013.01); B60K 6/48 (2013.01); B60K 6/387 (2013.01); B60W 10/02 (2013.01); Y02T 10/6286 (2013.01); B60W 10/06 (2013.01); B60W 20/00 (2013.01); B60W 10/08 (2013.01); Y10S 277/927 (2013.01)

USPC ................ 180/65.21; 180/65.25; 277/927; 277/304

(58) Field of Classification Search
USPC .................. 277/304, 927; 180/65.2, 65.21
See application file for complete search history.

(56) References Cited

U.S. PATENT DOCUMENTS

| 5,718,436 A * | 2/1998 | Dunford | 277/423 |
| 2008/0041646 A1* | 2/2008 | Lee et al. | 180/65.2 |

FOREIGN PATENT DOCUMENTS

| DE | 801802 | 1/1951 |
| DE | 927842 | 5/1955 |
| DE | 29 42 712 | 4/1981 |
| DE | 3811774 | 10/1988 |
| DE | 19616553 | 11/1997 |
| DE | 1020006056512 | 6/2008 |
| GB | 801802 | 9/1958 |

* cited by examiner

*Primary Examiner* — Hau Phan
*Assistant Examiner* — Bryan Evans
(74) *Attorney, Agent, or Firm* — Gerald E. Hespos; Michael J. Porco; Matthew T. Hespos

(57) ABSTRACT

A component housing in a motor-vehicle drive train is sealed by pressurization of the housing interior. The component is a hybrid module (1) comprising at least one electric machine provided between the combustion engine (VM) and the gearing (G) of the motor-vehicle drive train. The pressurization is achieved by a rotating component (R, RA, M, F) of the hybrid module. The rotating component is designed in a manner similar to an impeller of a centrifugal pump. Therefore, rotation of the component builds up a positive pressure (P) on the radially outer region of the rotating component in the region of the housing (GE) in the interior of the hybrid module.

12 Claims, 1 Drawing Sheet

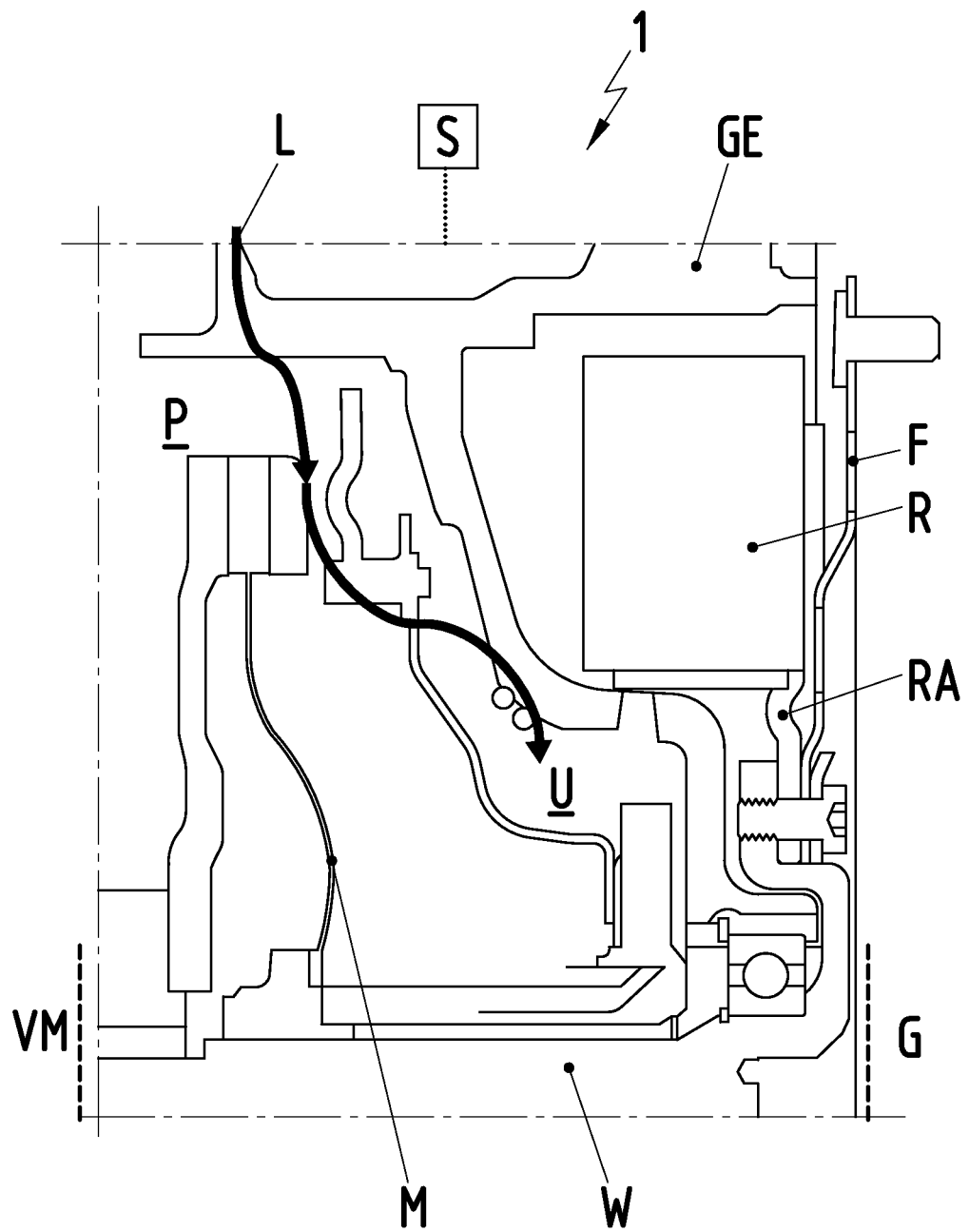

DEVICE FOR SEALING A COMPONENT HOUSING IN A MOTOR-VEHICLE DRIVE TRAIN

CROSS-REFERENCE TO RELATED APPLICATIONS

This application claims priority under 35 USC 119 to German Patent Application No. 10 2009 032 112.8 filed on Jul. 8, 2009, the entire disclosures of which are incorporated herein by reference.

BACKGROUND OF THE INVENTION

1. Field of the Invention

The invention relates to a device for sealing a component housing in a motor-vehicle drive train. The interior of the housing is acted upon with a pressure that is greater than the pressure prevailing outside the housing to prevent media, such as water or mud, is from penetrating to the interior of the housing.

2. Description of the Related Art

GB 801802 and DE 29 42 712 disclose devices for sealing a component case in a motor-vehicle by applying pressure in a housing that is greater than the pressure prevailing outside. These disclosures each use the compressed-air brake system of a utility vehicle as the compressed-air source for pressurization of the housing interior. The devices therefore can be used only if such a compressed-air source is present. In addition, relatively complicated control or regulation is necessary to connect the compressed-air source to the housing interior when the need arises.

The object of the invention is to provide a simplified device for sealing a housing, and particularly a device that does not require complicated pressurization control or regulation.

SUMMARY OF THE INVENTION

The invention relates to a hybrid module that is a component of the motor-vehicle drive train, and the housing of hybrid module is the component that is to be sealed. The hybrid module is provided in the motor-vehicle drive train between the combustion engine and the gearing. More particularly, the hybrid module comprises at least one electric machine that is connected mechanically to the drive train. The electric machine is connected electrically to an electric energy accumulator, for example a battery. In this instance, the electric machine operates as a motor when electric machine is supplied with current from the electric energy accumulator. The drive train is thus drivable by the electric motor and/or by the combustion engine. Alternatively, the electric machine can be operated as a generator by the drive-train rotation caused by the combustion engine or by kinetic energy of the motor vehicle being converted into electric energy (recuperation), which then is stored, for example, in the electric energy accumulator. A hybrid module that has only one electric machine, for example one having a capacity of between 10 and 25 kilowatts, is termed a mild hybrid. The hybrid module may also comprise a clutch between the electric machine and the combustion engine. In this case, when the clutch is open, the drive train is drivable solely by the electric machine, which is operated as a motor. In this case, more powerful electric machines customarily are employed than in the case of the mild hybrid, and this then is termed a full hybrid. The combustion engine also is started by the electric machine, which is operated as a motor, via the slipping clutch, and the clutch is actuated relatively frequently in a "parallel hybrid arrangement".

Of course, arrangements of the electric machine in the motor-vehicle drive train between the combustion engine and the gearing are possible other than the depicted parallel hybrid arrangement. For example, a "power-split hybrid" or a two-mode hybrid can be produced by using planetary gearings.

The invention uses a rotating component of the hybrid module to pressurize the interior of the housing of the hybrid module. The rotating component is designed similar to an impeller of a centrifugal pump. Therefore, rotation of the component builds up a positive pressure in the radially outer region thereof in comparison to a radially inner region. More particularly, the invention makes use of the fact that geometries of a hybrid module and a centrifugal pump are similar. Both of these geometries have a rotating component mounted in a housing. The rotating component of the hybrid module is designed analogously to the impeller of a centrifugal pump, and a corresponding effect also is produced in the hybrid module. The rotating component is coupled mechanically to the drive train and rotates whenever the drive train rotates. However, the drive train is driven by the electric motor to rotate virtually continuously during operation of the motor vehicle, the combustion engine and/or by kinetic energy of the motor vehicle (recuperation). Thus, complicated control or regulation of the pressurization of the housing interior of the hybrid module is no longer necessary. Specifically, the rotating component of the hybrid module is an impeller, and pressurization by the virtually continuous rotation of the drive train during operation of the motor vehicle is provided virtually continuously in the housing interior of the hybrid module. The radially outer region of the rotating component of the hybrid module is in the vicinity of the housing in the interior of the hybrid module. Thus, positive pressure is produced in the housing. Therefore, when the hybrid module is used, for example, in the drive train of an off-road vehicle, the ingress of water during fording a stream or when driving through puddles, and also the ingress of dust reliably are prevented.

The rotating component preferably is a rotor element of the electric machine, such as a rotor of the electric machine or a rotor connection of the electric machine to the drive train. For example, an external rotor rotates about a fixed stator. In the case of a single-shaft parallel hybrid, the stator is near an extension of the crank shaft of the combustion engine. The rotor of the electric machine therefore rotates about an axial extension of the crank shaft. The rotor may be connected to the drive train via a rotor hub. The rotor hub may be designed suitably in the form of an impeller of a centrifugal pump by, for example providing impeller blades. Thus, there is a reliable build up of pressure in the radially outer region of the rotor element in comparison to the radially inner region thereof. The radially outer region is arranged near the housing of the hybrid module. Therefore, the hybrid module reliably is pressurized when the motor vehicle is in operation, i.e. when the drive train rotates.

Alternatively or additionally, a single-shaft parallel hybrid may be present between the combustion engine and electric machine and may have a clutch with a clutch element that acts as a rotating component. The rotating component for this embodiment of the invention may be in the form of an impeller of a centrifugal pump, and in particular may constitute the driving disc of the clutch. The driving disc may be arranged on the drive train adjacent to the electric machine and rotates even when the combustion engine is decoupled. Therefore, even during operation of the hybrid vehicle without a combustion engine, i.e. during electric travel or during recuperation, reliable pressurization of the hybrid module always is ensured because the driving disc is in the form of an impeller of a centrifugal pump. Of course, other clutch elements may also be designed as impellers of a centrifugal pump.

Alternatively or additionally, the hybrid module may have a connection to a torque converter arranged upstream of the gearing of the drive train. In this case, the rotating component of the invention is a flex plate in the form of an impeller of a centrifugal pump. The flex plate always rotates during operation of the hybrid vehicle so that reliable pressurization of the hybrid module is produced by providing the flex plate in the form of an impeller of a centrifugal pump.

The vehicle preferably includes an air-conveying line through which air flows from outside the housing of the hybrid module into the radially inner region of the rotating component, which according to the invention is in the form of an impeller of a centrifugal pump. The impeller of the centrifugal pump conveys the air into a radially outer region of the rotating component. In each case, the radially outer region is within the hybrid module in the vicinity of the housing. A positive pressure therefore is produced in the region in the vicinity of the housing, as compared with the pressure outside the housing and the pressure at the radially inner region of the rotating component, which is connected thereto by the air-conveying line. In this case, the air-conveying line preferably ends outside the housing of the hybrid module at a dust-protected location or above the envisaged fording depth of the motor vehicle.

A hybrid module in accordance with a second embodiment of the invention has at least one hydraulic clutch that can be activated by an actuator. The actuator comprises a hydraulic cylinder in which a piston is movably arranged. Actuation of the actuator causes the piston to displace the hydraulic fluid in the hydraulic cylinder to activate the clutch. Air then enters the cavity produced in the process. Therefore, in each case, the air located in the hydraulic cylinder is displaced again by the piston during the return of the actuator. According to the invention, the displaced air now is used to pressurize the hybrid module. For this purpose, for example, a blow hole is provided in the region of the hydraulic cylinder behind the piston that is activated by the actuator. Corresponding pressurization of the hybrid module, in turn, is produced by a corresponding line or hose between the actuator and hybrid module. Complicated control or regulation of the pressurization is not necessary, since, in the case of the single-shaft parallel hybrid with a clutch, the combustion engine is started relatively frequently by the electric machine, which is operated as a motor, via the slipping clutch. Hence, there is an activation of the clutch and a corresponding pressurization of the hybrid module during each starting operation of the combustion engine without complicated regulation or additional pump units being necessary for the pressurization. The actuator is designed, for example, as a spindle actuator, but other solutions are also possible.

Positive pressure provided by the actuator also can be used for at least partial pressurization of further components of the hybrid vehicle, such as the combustion engine, gearing or brakes.

A pressure accumulator can be used for the positive pressure provided in each case by the actuator. Thus, the pressure peaks are smoothed and the hybrid module is pressurized uniformly without complicated control or regulation.

The invention is now illustrated in more detail with reference to a drawing.

BRIEF DESCRIPTION OF THE DRAWING

The FIGURE is a section through a corresponding hybrid module by way of example.

DETAILED DESCRIPTION OF THE PREFERRED EMBODIMENTS

The FIGURE shows a hybrid module 1 of a single-shaft parallel hybrid arranged between the combustion engine VM to the left of the hybrid module 1 and a torque converter or gearing G to the right of the hybrid module 1. The hybrid module 1 has a shaft W and is illustrated as a section only in its part located above the shaft W. A housing GE is provided radially outside the shaft W. The shaft W of the single-shaft parallel hybrid extends from the combustion engine VM via the hybrid module 1 as far as the gearing G of the drive train. An electric machine with a rotor R is encompassed by the hybrid module 1. The rotor R is coupled mechanically to the shaft W via the rotor connection RA.

When the electric machine is operated as a motor, the rotor R is supplied with electric current and rotates about the shaft W to drive the drive train. When the electric machine is operated as a generator, the shaft W rotates and carries along the rotor R via the rotor connection RA, and therefore an electric current is generated. In both cases, the rotor connection RA has an appropriate arrangement of impeller blades and functions as an impeller of a centrifugal pump. In this case, air flows through an air-conveying line L from outside the housing GE into the region of the shaft W. The air is conveyed from the region of the shaft W to the region of the housing GE by the impeller of the centrifugal pump, i.e. by the correspondingly designed rotor connection RA. This results in a positive pressure P in the region of the interior of the housing GE, compared to the pressure U outside the housing GE and compared to that region of the shaft W that is connected thereto by the air-conveying line L. The radially inner region of the rotor connection RA, i.e. the region around the shaft W, and the region outside the housing GE are connected by the air-conveying line L, and hence these two regions have the same pressure U.

A section through the upper part of the hybrid module 1 is visualized in the FIGURE. In particular the housing GE, the rotor R and the rotor connection RA that comprise the hybrid module 1 extend in a rotationally symmetrical manner about the shaft W. The vehicle equipped with the drive train may ford a stream that can even be higher than the height of the shaft W, so that the lower half or more of the hybrid module 1 is located under water. Water or mud could therefore penetrate through corresponding openings or untight locations in the hybrid module 1 into the region of the electric machine and cause damage there. However, the build up of positive pressure P in the radially outer region of the rotor connection RA and/or of the flexplate F and/or of the driving disc M of the clutch produces a positive pressure P in the interior of the hybrid module 1 in the region of the housing GE that extends radially on the outside around the shaft W. The penetration of water, mud or dust into the hybrid module 1 therefore is prevented reliably.

What is claimed is:

1. A hybrid module comprising at least one electric machine provided between a combustion engine and gearing of a drive train of a motor-vehicle, the hybrid module having a housing and at least one rotating component disposed in the housing, at least part of the rotating component being configured with a shape of an impeller of a centrifugal pump, so that rotation of the rotating component achieves pressurization in the housing and builds up a positive pressure on a radially outer region of the rotating component in proximity to the housing in the interior of the hybrid module for preventing an inflow of liquid into the housing from areas surrounding the housing.

2. The hybrid module of claim 1, wherein the rotating component is a rotor of the electric machine or a rotor connection of the electric machine to the drive train.

3. The hybrid module of claim 1, wherein the hybrid module comprises a clutch between the combustion engine and electric machine, and wherein the rotating component is a clutch element defining a driving disc.

4. The hybrid module of claim 1, wherein the hybrid module comprises a connection to a torque converter of the gearing of the motor-vehicle drive train, and wherein the rotating component is a flexplate.

5. The hybrid module of claim 1, wherein the rotating component comprises impeller blades.

6. The hybrid module of claim 1, wherein air conduction is provided from outside the housing into a radially inner region of the rotating component.

7. A hybrid module provided between a combustion engine and gearing of a drive train of a motor-vehicle, the hybrid module comprising: a housing and at least one rotating component in the housing, the rotating component being configured so that rotation of the rotating component builds up pressure on a radially outer region of the rotating component and in proximity to the housing in an interior of the housing of the hybrid module to define a positive pressure in the housing and at a radially outer region of the rotating component that exceeds pressure outside the housing, whereby the positive pressure in the housing at the radially outer region of the rotating component and in excess of pressure outside the housing prevents intrusion of liquid into the housing.

8. The hybrid module of claim 7, wherein the rotating component is a rotor of the electric machine or a rotor connection of the electric machine to the drive train.

9. The hybrid module of claim 8, wherein the rotating component comprises impeller blades.

10. The hybrid module of claim 9, wherein air conduction is provided from outside the housing into a radially inner region of the rotating component.

11. The hybrid module of claim 7, wherein the hybrid module comprises a clutch between the combustion engine and electric machine, and wherein the rotating component is a clutch element defining a driving disc.

12. The hybrid module of claim 7, wherein the hybrid module comprises a connection to a torque converter of the gearing of the motor-vehicle drive train.

\* \* \* \* \*